Jan. 6, 1970  D. R. TANGUY  3,488,574
BOREHOLE INVESTIGATING METHODS AND APPARATUS INCLUDING
THE DETECTION OF A CASED BOREHOLE FROM
ANOTHER NEARBY BOREHOLE
Filed Nov. 1, 1966  5 Sheets-Sheet 2

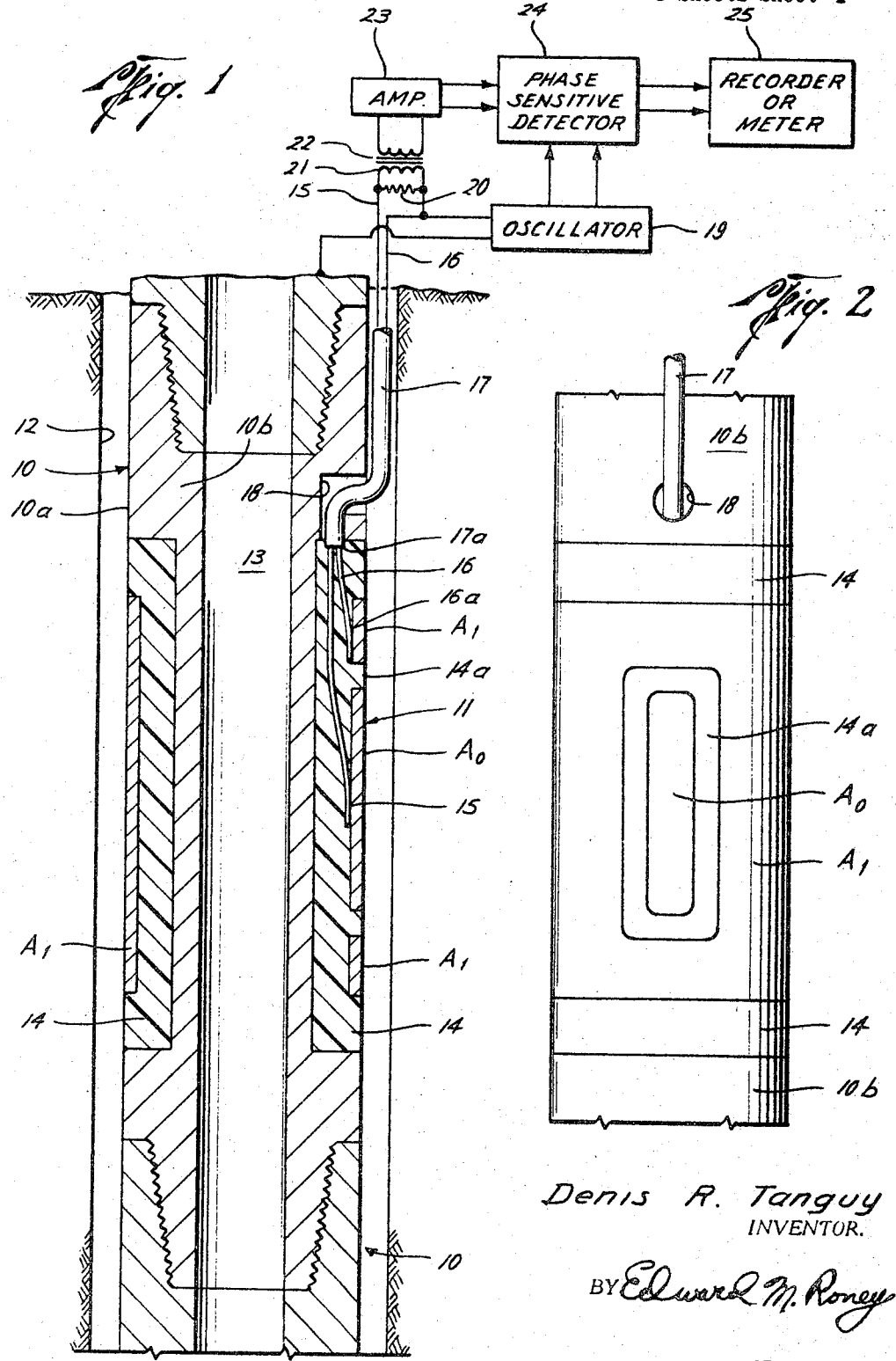

Denis R. Tanguy
INVENTOR.

BY Edward M. Romey
ATTORNEY

Denis R. Tanguy
INVENTOR.
BY Edward M. Roney
ATTORNEY

Jan. 6, 1970

D. R. TANGUY 3,488,574

BOREHOLE INVESTIGATING METHODS AND APPARATUS INCLUDING
THE DETECTION OF A CASED BOREHOLE FROM
ANOTHER NEARBY BOREHOLE

Filed Nov. 1, 1966

Denis R. Tanguy
INVENTOR.

BY Edward M. Roney

ATTORNEY

United States Patent Office 3,488,574
Patented Jan. 6, 1970

3,488,574
BOREHOLE INVESTIGATING METHODS AND APPARATUS INCLUDING THE DETECTION OF A CASED BOREHOLE FROM ANOTHER NEARBY BOREHOLE
Denis R. Tanguy, Houston, Tex., assignor to Schlumberger Technology Corporation, Houston, Tex., a corporation of Texas
Filed Nov. 1, 1966, Ser. No. 591,207
Int. Cl. G01v 3/02
U.S. Cl. 324—1
16 Claims

ABSTRACT OF THE DISCLOSURE

In accordance with illustrative embodiments of the present invention, methods and apparatus are disclosed for detecting the location of a cased borehole from another nearby borehole. More particularly, a directionally focused electrode array is rotated circumferentially around a borehole to provide measurements of the resistivity or conductivity of the surrounding formations. The maximum and minimum measurement values are then detected and combined in a desired manner to produce an indication of the distance between the two boreholes. The azimuth direction of the maximum measurement value indicates the azimuth direction of the cased borehole. Desirably, the electrode array is embedded in a section of drill pipe and the entire drill pipe is rotated to enable detection of the maximum and minimum values.

---

This invention relates to borehole investigating methods and apparatus. More particularly, the invention relates to the detection of a cased borehole from another nearby borehole. The invention has special utility in the detection of cased boreholes from a nearby borehole with the drill pipe present in the nearby borehole. The invention additionally relates to the logging of earth formations surrounding boreholes when the drill pipe is present in the borehole.

When drilling boreholes for thousands of feet into the earth, it is difficult to maintain the borehole axis on a desired course for the thousands of feet that may be required for the depth of the borehole. It is sometimes desirable to drill a borehole a relatively close distance to one or more already existing boreholes, which more than likely will be already cased. If the drilling operator cannot determine how close the borehole being presently drilled is to the nearby cased borehole, there is a chance that the drill bit will run into the nearby cased borehole at some point below the surface of the earth, causing damage to the casing or cement. Also, it may be desirable to deviate the presently drilled borehole away from the existing borehole at some point below the earth's surface, in which case, the direction of the existing borehole should be known. Thus, it would be desirable to ascertain during the drilling operation from time to time, the location of the nearby cased borehole, including the distance between the borehole being presently drilled and the nearby cased borehole along with the direction thereof, so that the driller can maintain a relatively minimum distance between the two boreholes. In some cases, it might also be desirable to determine the distance between a cased borehole and a nearby uncased borehole from which the drill pipe has been removed.

In the case of the detection of a nearby cased borehole from a borehole being presently drilled, it would be desirable to not have to pull the drill pipe out of the borehole in order to lower the necessary logging equipment into the borehole. However, to obtain measurements from well logging apparatus while the drill pipe is still in the borehole presents many problems. One of these problems is that most types of logging apparatus will not operate effectively in the presence of drill pipe due to the large mass of metal which is in the presence of the investigating apparatus.

Another problem that occurs whenever it is desired to obtain well logging measurements with the drill pipe still in the borehole concerns communicating the information obtained from the well logging measurements to the surface of the earth. One manner of accomplishing this communication is to utilize a downhole recorder to record the measurements as they are obtained. In this case, the information is retrieved from the recorder either after the drill pipe is brought to the surface of the earth, as shown in U.S. Patent No. 2,941,784 granted to J. L. Martin on June 21, 1960, or a connection is made to the recorder while the drill pipe is still in the borehole for enabling the recorder to supply the information to the surface of the earth at various times during the drilling operation, as shown in U.S. Patent No. 3,209,323 granted to G. J. Grossman, Jr., on Sept. 28, 1965. However, there are many inherent disadvantages in placing a recorder downhole during a drilling operation due to a shortage of available space, mechanical shock caused by the drilling operation, and the fact that it cannot be immediately known what is the character of the measurements being obtained, or if measurements are being obtained at all. In rotary drilling, it is not possible to have a permanent cable connecting the downhole well logging apparatus because of the rotation of the drill pipe.

Another manner of obtaining well logging measurements while the drilling apparatus is still in the borehole is to lower the connecting apparatus down through the center of the drill pipe to the well logging apparatus within the drill pipe at the end of the borehole, also shown in the Grossman patent, supra. However, whenever a connecting apparatus is lowered through the drill pipe to make connection with the downhole well logging apparatus, there is a problem of current leakage through the conductive drilling mud at the connection, or if the connecting apparatus is magnetic, there is a problem of the drilling mud altering the mutual coupling between the connecting apparatus lowered through the drill pipe and the connecting apparatus associated with the well logging apparatus. This problem may possibly be solved by utilizing apparatus to remove all of the drilling mud from the connecting means but this type of apparatus is complex, expensive and generally unreliable. Apparatus for solving this problem can be utilized with any well logging apparatus contained within the drill pipe regardless of whether used for the investigation of the surrounding earth formations or for the detection of nearby cased boreholes.

It is an object of the invention, therefore, to provide new and improved methods and apparatus for the detection of a cased borehole from another nearby borehole.

It is another object of the invention to provide new and improved methods and apparatus for investigating subsurface earth formations while the drilling apparatus is still in the borehole.

In accordance with one feature of the present invention, a borehole investigating apparatus comprises at least one electrode array within a first borehole adapted to rotate circumferentially around the first borehole, said at least one electrode array comprising a central survey electrode defining a circumferential angle around the nearby borehole of less than 360° and an outer focusing electrode surrounding the central survey electrode. The apparatus further comprises means for supplying current to the survey and focusing electrodes for emission into the surrounding earth formations, the emitted focusing current confining the emitted survey current to a desired current flow pattern and means for measuring an electrical parameter of the current emitted from the central survey electrode as the electrode array is rotated circumferentially around the first borehole. The maximum and minimum values of the measured electrical parameter can then be combined to determine the distance between the first borehole and a nearby cased borehole.

In accordance with another feature of the invention, a borehole investigating apparatus comprises a focused electrode array, including survey and focusing electrodes and connecting means for making electrical contact with said electrodes, embedded in a portion of drilling apparatus within a borehole. The apparatus further comprises means adapted for supplying current to the survey and focusing electrodes of the focused electrode array for emission into the surrounding earth formations to provide a measure of an electrical parameter of a formation, the voltage on said survey and focusing electrodes being maintained substantially the same. The apparatus further comprises movable connecting means adapted to be lowered through the borehole to the electrode array to connect the current-supplying and measuring means to the connecting means of the electrode array. To insure that the movable connecting means is properly positioned relative to the electrode array connecting means, the internal diameter of a given section of the drill pipe can be progressively reduced to mate with a portion of the movable connecting means having a progressively reduced outer diameter. Since the voltages on the survey and focusing electrodes are substantially the same, the voltages on the contacts of the connecting means will be substantially the same. Thus, there will be very little, if any, current leakage between the contacts of the connecting means.

In accordance with still another feature of the invention, a borehole investigating method comprises rotating at least one focused electrode array circumferentially around a first borehole, said focused electrode array having a central survey electrode defining a circumferential angle of less than 360° around the first borehole. The method further comprises supplying current to the survey and focusing electrodes for emission into the surrounding earth formations, the emitted focusing current confining the emitted survey current to a desired current flow pattern, and measuring an electrical parameter of the current emitted from the central survey electrode as the electrode array is rotated circumferentially around the first borehole. The method further comprises detecting the direction of a cased borehole in response to the maximum value of the electrical parameter correlated with the circumferential direction of the central survey current electrode.

For a better understanding of the present invention, together with other and further objects thereof, reference is had to the following description taken in connection with the accompanying drawings, the scope of the invention being pointed out in the appended claims.

Referring to the drawings:

FIGURE 1 illustrates one embodiment of the present invention useful in turbo drilling operations wherein an electrode array is embedded in a portion of the drill pipe in the borehole, along with a schematic representation of electrical circuitry to be utilized therewith;

FIGURE 2 illustrates a front view of the electrode configuration embedded in the drill pipe of FIGURE 1;

FIGURE 6 illustrates an electrode array mounted on wall-engaging pad members in an uncased borehole along with a schematic representation of the electrical circuitry to be utilized therewith.

Figure 3A:
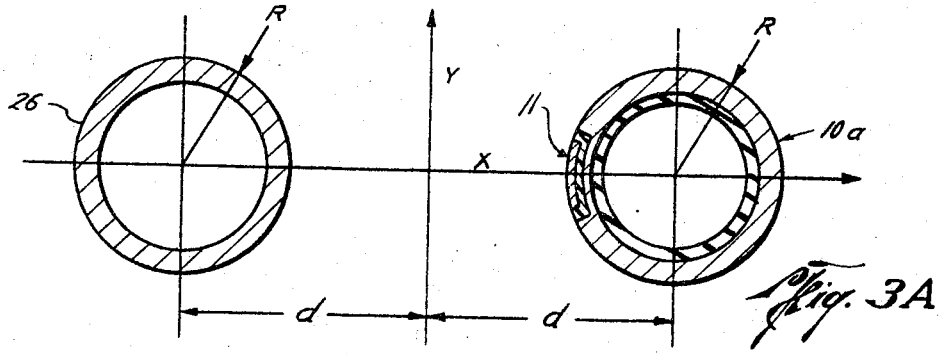
FIGURE 3a is an illustration of the electrode configuration of FIGURE 1 embedded in the drill pipe for detecting a nearby cased borehole, which is useful in explaining the theory of how the distance between the two boreholes is determined.

Referring to FIGURE 1 of the drawings, there is shown a drill pipe 10 having a portion 10a in which is embedded an electrode array 11 for use with turbo drilling operations. Since the drill bit (not shown) has a greater diameter than the drill pipe, the borehole 12 has a greater diameter than the drill pipe 10 thus creating a small opening between the borehole 12 and the drill pipe 10 which is filled with a conductive drilling mud 13. The hollow center opening of the drill pipe 10 is also filled with drilling mud 13. A portion of the drill pipe section 10a is made of an insulation material 14 which extends around the circumference of the drill pipe section 10a. Embedded in a portion of the insulation material 14 is a central survey electrode $A_0$ having an outlet face thereof on the outer circumference of the drill pipe 10 and exposed to the drilling mud 13. Separated by a portion 14a of the insulation material 14 is an outer focusing electrode $A_1$ which completely surrounds the central survey electrode $A_0$ on the outer circumference of the drill pipe section 10a and extends completely around the circumference of the drill pipe section 10a. The remainder of drill pipe section 10a comprises a metal portion 10b, located above and below the insulating material 14, in FIGURE 1.

Connections are made to the electrodes $A_0$ and $A_1$ by insulated conductors 15 and 16 respectively embedded in insulation material 14 whose bare end portions 15a and 16a are welded or soldered to their respective electrodes. The conductors 15 and 16 pass to the surface of the earth through an insulated cable 17 whose lower end 17a is embedded in the top portion of the insulation material 14. An opening 18 is formed in the drill pipe section 10a to enable the insulated cable 17 to pass out of the drill pipe section 10a and up through the gap between the drill pipe 10 and the borehole 12 to the surface of the earth. The cable 17 is enabled to pass to the surface of the earth in this manner since, in turbo drilling, the drill pipe is not rotated to cause the drilling action, but instead, the drilling mud causes the drilling action.

Now looking at FIGURE 2, there is shown the front view of the section 10a of drill pipe, looking at the survey electrode $A_0$. It can be seen that the survey electrode $A_0$ is a narrow rectangular piece of metal surrounded by the portion 14a of insulation material 14 so as to insulate survey electrode $A_0$ from focusing electrode $A_1$ which surrounds the portion 14a of insulation material 14. The focusing electrode $A_1$ is shown extending around the circumference of drill pipe section 10a. Upper and lower rings of insulation material 14 are shown above and below the focusing electrode $A_1$ so as to insulate focusing electrode $A_1$ from the metal portion 10b of drill pipe section 10a. The cable 17 is shown extending out of the hollow portion 18 of the metal portion 10b of drill pipe section 10a.

Now looking at the surface electrical apparatus of FIGURE 1, the signals from the insulated conductors 15 and 16 are obtained by suitable means, as for example, slip rings (not shown), but are shown extending out of the end of cable 17. The conductor 16 is connected to one output of an oscillator 19, the other ouput of which is connected to the casing 10 at the surface of the earth. Conductors 15 and 16 are connected across a low resistance measure resistor 20 and the primary winding 21 of a transformer 22. The secondary winding of transformer 22 is connected to the input of an amplifier 23, the output of which is connected to the input of a phase-sensitive detector 24 which derives its phase-reference signal from oscillator 19. The output of phase-sensitive detector 24 is connected to a suitable indicating means, such as recorder 25.

Now concerning the operation of the electrical circuitry of FIGURE 1, the oscillator 19 supplies a constant voltage output signal between focusing electrode $A_1$ within drill pipe section $10a$ and drill pipe 10. Since the resistance of the measure resistor 20 is very low, central survey electrode $A_0$ is at substantially the same potential as focusing electrode $A_1$. Thus, it can be seen that due to this equal potential situation, the survey current emitted from central survey electrode $A_0$ will be focused in an outward direction by the focusing current emitted from focusing electrode $A_1$. Since the voltage of central survey electrode $A_0$ is substantially constant, the magnitude of the current emitted from survey electrode $A_0$ is the electrical parameter measured and is representative of the resistance presented to central survey electrode $A_0$ between the electrode $A_0$ itself and the current return of drill pipe 10. If desired, the current to survey electrode $A_0$ could be maintained constant and the voltage variations measured.

The voltage developed across measure resistor 20 is proportional to the magnitude of this current and is measured by amplifier 23 via transformer 22. Phase-sensitive detector 24 supplies a DC output signal to recorder 25 which is proportional to that portion of the signal received by amplifier 23 which is in-phase with the oscillator 19 output signal. Thus, a signal proportion to the resistance presented to central survey electrode $A_0$ is supplied to recorder 25.

Before proceeding with the explanation of how the apparatus of FIGURE 1 determines the distance between a cased borehole and a nearby borehole with drilling apparatus present therein, it would first be desirable to develop the relationship used to determine this distance.

Now looking at FIGURE 3, there is shown the electrode array 11 of FIGURE 1 embedded in the drill pipe section $10a$ which is near a cased borehole 26. The $y$-axis is placed midway between drill pipe section $10a$ and the nearby cased borehole 26. The distance between the $y$-axis and the center point of the drill pipe section $10a$ and the center point of the nearby casing 26 is designated $d$. The combination of the focusing and survey electrodes constitute an equipotential cylinder. For present purposes, the two boreholes are assumed to be in an homogeneous isotropic media of conductivity $\sigma$ mho./meter and to have the same radius R. The conductivity of the drill pipe 10 and the casing of the nearby borehole are assumed to be infinite with respect to the adjoining earth formations.

To compute the distance between the two boreholes, the resistance presented to the central survey electrode $A_0$ when it is facing toward the nearby borehole 26 along the $x$-axis, and when it is rotated 180°, i.e. facing away from the nearby borehole 26, is determined. Thus, the current density on both sides of the drill pipe section $10a$ along the $x$-axis must be determined. That is, the current density at $x=d-R$, $y=0$ and at $x=d+R$, $y=0$ must be determined. Since the current density J is equal to $\sigma \cdot E$ where E is the electric field, and the conductivity of $\sigma$ of the earth formations on both sides of the drill pipe section $10a$ are the same, the electric field E can be computed at the two above points instead of the current density J.

The equation for the scalar potential field $\phi$ between the drill pipe section $10a$ and the nearby casing 26 can be written as:

$$\phi = \frac{V_0}{4 \cosh^{-1}\frac{d}{R}} \ln \frac{(x-a)^2+y^2}{(x+a)^2+y^2} \quad (1)$$

where $V_0$ is the voltage applied between the electrodes of the drill pipe section $10a$ and the nearby casing 26, and the relationship for $a$ is:

$$a = \sqrt{d^2-R^2} \quad (2)$$

At points $x=d-R$, $y=0$ and $x=d+R$, $y=0$, the electric field vector E has only one component $E_x$, the relationship for which is:

$$E_x = d\phi/dx \quad (3)$$

Combining Equations 1 and 3:

$$E_x = \frac{V_0}{2 \cosh^{-1}\frac{d}{R}} \left[ \frac{x-a}{(x-a)^2+y^2} - \frac{x+a}{(x+a)^2+y^2} \right] \quad (4)$$

Since the electric field E on the $x$-axis only is desired, $y$ can be set equal to zero in Equation 4 making Equation 4 equal to:

$$E_x,(y=0) = \frac{V_0}{2 \cosh^{-1}\frac{d}{R}} \left[ \frac{1}{x-a} - \frac{1}{x+a} \right] \quad (5)$$

Making $x=\pm R$, Equation 5 can be written as:

$$E_{(d\pm R,0)} = \frac{V_0}{2 \cosh^{-1}\frac{d}{R}} \left[ \frac{1}{d\pm R - \sqrt{d^2-R^2}} - \frac{1}{d\pm R + \sqrt{d^2-R^2}} \right] \quad (6)$$

Since the ratio of the electric fields at $x=d+R$, $y=0$ to $x=d-R$, $y=0$ is what is desired, rearranging Equation 6:

$$\frac{E_{(d+R),0}}{E_{(d-R),0}} = \frac{R-d}{R+d} \quad (7)$$

Thus, it can be seen from Equation 7 that since R is known and $E_{(d+R),0}$ and $E_{(d-R),0}$ can be measured, the distance $2d$ between the two boreholes can be determined. Solving Equation 7 for $2d$ gives:

$$2d = \frac{2R(E_{(d-R),0} - E_{(d+R),0})}{E_{(d-R),0} + E_{(d+R),0}} \quad (8)$$

If the radius R of the drill pipe $10a$ and the nearby casing 26 are not the same, the relationship $E_{(d+R),0}/E_{(d-R),0}$ could be calculated in the same manner, or could be determined by empirical methods.

Figure 3B:
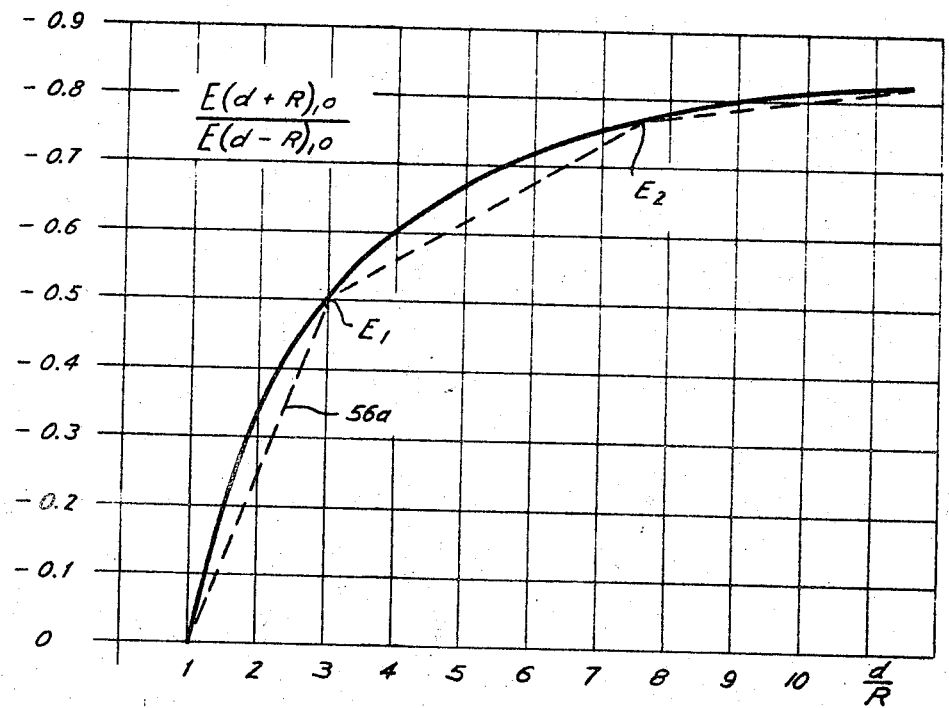
FIGURE 3b is a graph useful in explaining the theory of how the distance between two boreholes is determined.

Looking now at FIGURE 3b, there is shown a graph of the ratio of the electric field E at $x=d+R$, $y=0$ to the electric field E at $x=d-R$, $y=0$ on the $y$-axis and the ratio $d/R$ on the $x$-axis from Equation 7.

Returning now to FIGURE 1, when the central survey electrode $A_0$ is at the closest point to the nearby cased borehole, corresponding to the point $x=d-R$, $y=0$ in FIGURE 3a, the current being emitted from the central survey electrode will be at its highest level, the voltage in FIGURE 1 being maintained constant, since the total resistance being presented to central survey electrode $A_0$ at this point is at a minimum. On the other hand, when the central survey electrode $A_0$ is turned 180° from this point, that is corresponding to the point $x=d+R$, $y=0$ in FIGURE 3, the resistance being presented to the central survey electrode $A_0$ will be at a maximum and the current emitted therefrom will be at a minimum.

Figure 5:
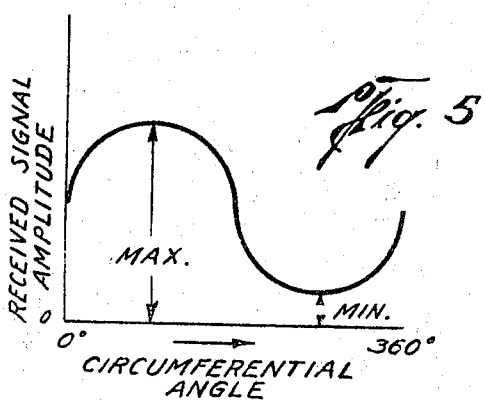
FIGURE 5 illustrates a plot of the signal amplitude at a point in the electrical circuitry of FIGURES 1, 4 and 6 which is useful in explaining the operation thereof.

Looking at FIGURE 5, there is shown the wave form recorded in recorder 25 as the electrode array is rotated around the circumference of the borehole, which wave form is indicative of the distance $2d$. The maximum and minimum values utilized to compute the distance $2d$ are shown in FIGURE 5.

Thus, it can be seen that by rotating the drill pipe including the electrode array around the circumference of the borehole, a maximum and minimum value of survey current can be measured. The ratio of the minimum to maximum values taken from recorder 25 can be utilized with the graph of FIGURE 3b to determine the distance $2d$ between the two boreholes. The direction of the nearby casing is determined by noting the circumferential angle where a maximum reading to recorder 25 is obtained.

Since the current through measure resistor 20 is the current being emitted from central survey electrode $A_0$, and is proportional to the current density J, which as has been established earlier is proportional to the electric field E, the signal applied from phase-sensitive detector 24 to recorder 25 is proportional to this electric field E. Thus, to determine the distance $2d$ between the two boreholes, one merely has to determine the ratio of the maximum and minimum readings from recorder 25, and apply this figure to the graph of FIGURE 3b to determine the ratio $d/R$. Then, knowing R, the distance $2d$ between the two boreholes can calculated.

Figure 4:
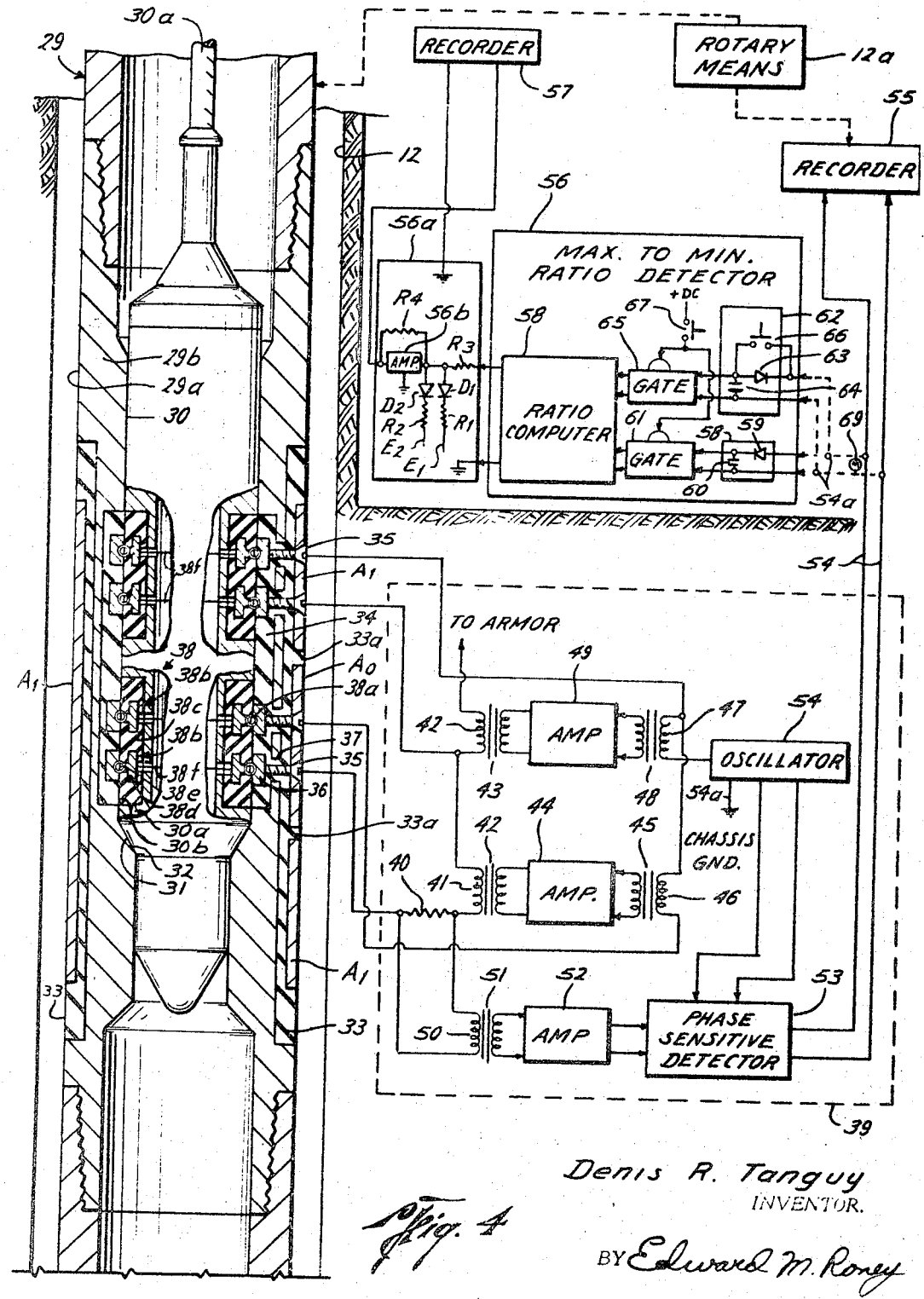
FIGURE 4 illustrates another embodiment of the borehole apparatus of the present invention useful in connection with rotary drilling operations.

Looking now at FIGURE 4, there is shown apparatus for determining the distance between a borehole with drill pipe containing within it and a nearby cased borehole when rotary drilling is being utilized. A section 29a of the drill pipe 29 has the electrode array embedded therein in the same manner as the FIGURE 1 apparatus. However, in the FIGURE 4 apparatus, a connecting member 30 on the end of an armored multiconductor cable 30a is lowered or pumped down through the center of the drill pipe 29 so as to make contact with the electrode array embedded in the drill pipe section 29a. The metal portion 29b of the drill pipe section 29a below the electrode array is tapered to a smaller diameter internal opening so that the connecting means 30 will be stopped at a fixed predetermined point relative to the electrode array. The connecting means 30 likewise has a matching tapered portion 32 that tapers from a larger diameter to a smaller diameter of connecting means 30. The tapering portions of drill pipe section 29a and connecting means 30 are tapered so that they will match, thus enabling connecting means 30 to stop at a predetermined point relative to drill pipe section 10a without a severe sudden shock. The bottom of connecting means 30 has a suitable rounded shape to provide easy descent through the hollow center portion of drill pipe 29.

The drill pipe section 29a has a central survey electrode $A_0$ which is surrounded by an outer focusing electrode $A_1$ in the same manner as in FIGURES 1 and 2. These electrodes are embedded in an insulation material 33 which has a portion 33a between the electrodes $A_0$ and $A_1$ to insulate them from one another in the same manner as in FIGURES 1 and 2. The metal portion 29b of drill pipe section 29a extends circumferentially around the drill pipe section 29a at the electrode array portion thereof to provide the necessary strength for drill pipe 29. On the inside portion of drill pipe section 29a in the vicinity of the electrode array is another insulation portion 34 extending circumferentially around the center portion of drill pipe section 29a.

A plurality of screws 35 secure the electrodes $A_0$ and $A_1$ in place and provide an electrical connection to a plurality of metal rings 36 which have one side exposed to the hollow inner part of drill pipe section 29a and extend around the circumference of drill pipe section 29a. The screws 35 and metal rings 36 comprise a connecting means for making electrical contact with the movable connecting means 30. The metal portion 29b of drill pipe section 29a has a plurality of openings 37 therein so as to allow the screws 35 to pass from the electrodes $A_0$ and $A_1$ to the metal rings 36 without coming in contact with the metal plate portion 29b. Insulation material is placed between the screws 35 and the metal plate portion 29b.

The connecting means 30 has a plurality of electrical contact means 38 which comprise spring members 38a and suitable support members 38b for securing the spring members 38a to the connecting means 30. The support members 38b are embedded in insulation material 38c, which has semicircular shaped cutout portions for positioning spring members 38a. The support members 38b comprise a solid metal portion 38d and a portion 38e having a plurality of openings therein in which the coils of the spring members 38a are positioned. Desirably, the support members 38b are located at several points around the outer circumference of the connecting means 30. The outer metal portion 30a of connecting means 30 has rectangular cutout portions 30b in which are secured the insulation material 38c of each contact means 38. The inner portion of connecting means 30 contains the downhole electrical circuitry in a suitable fluid-tight housing.

The electrical contact means 38 are connected to the electrical circuitry by conductors 38f which are connected to the support members 38b and pass through openings in the metal of connecting means 30. The metal rings 36 have semicircular cutout portions therein for receiving the spring members 38a. It can be seen that since each of the electrodes and thus contact means are at the same potential, there will be a negligible amount of leakage current between the respective contact means, the impedance through the earth formations being substantially less than the impedance between the contact means. This impedance between the contact means can be controlled to some extent by manufacturing the movable connecting means 30 such that the spacing between the drill pipe section 29a and the movable connecting means 30 is at a minimum. However, since the contact means are all at the same potential, this spacing can be relatively great without affecting the accuracy of the well logging measurements, thus allowing reasonable manufacturing tolerances and correct operation in view of changes in diameter due to downhole temperature, pressure, etc. If desired, connecting means 30 can be made entirely of a rubber material with the contact means 38 embedded in the outer portion thereof and suitable channels formed in the rubber material for passage of the conductors.

Concerning the electrical portion of the FIGURE 4 apparatus, the electrical circuitry could be placed in a fluid-tight container within the connecting means 30, or alternatively, could all be placed at the surface of the earth. In FIGURE 4, a portion of the electrical circuitry is shown contained within a fluid-tight container within the connecting means 30, as represented by the dotted line box 39. The electrical conductors connecting the electrodes to the electrical circuitry are shown connected to the screws 35 for simplicity, but of course, the connection is actually made through the contact means 38.

One of the screws 35 within the $A_0$ electrode is connected through a low resistance measure resistor 40 to one side of the secondary winding 41 of a transformer 42. The other side of secondary winding 41 is connected to one of the screws 35 of the $A_1$ electrode and to one side of the secondary winding 42 of a transformer 43. The other side of secondary winding 42 is connected to the armor of the armored multiconductor cable 30a. The primary winding of transformer 42 is connected to the output of amplifier 44, the input of amplifier 44 being connected across the secondary winding of a transformer 45. One side of the primary winding 46 of transformer 45 is connected to another screw member on electrode $A_0$. The other side of the primary winding 46 is connected to the other screw member 35 within electrode $A_1$ and to one side of the primary winding 47 of a transformer 48. The secondary winding of transformer 48 is connected to the input of an amplifier 49, the output of which is connected to the primary winding of transformer 43.

The primary winding 50 of a transformer 51 is connected across the measure resistor 40, the secondary winding of transformer 51 being connected to the input of an amplifier 52. The output of amplifier 52 is connected to the input of a phase-sensitive detector 53. An oscillator 54 supplies the phase-reference signal to phase-sensitive detector 53. Oscillator 54 also supplies a constant voltage output between the other side of the primary winding 47 of transformer 48 and a suitable common return point, such as chassis ground. The output from phase-sensitive detector 53 is supplied to the surface of the earth via a conductor pair 54 which travels through the armored multiconductor cable 30a (but is shown connected directly to the surface of the earth for purposes of clarity). The conductor pair 54 is connected to a recorder 55 that records the indications from phase-sensitive detector 53. A rotating means 12a causes the rotation of drill pipe 29 and drives the chart of recorder 55 as a function of the angular position of drill pipe 29. This rotating means could take the form of the rotating means associated with the drilling rig. The angular position of drill pipe 29 coinciding with the position of survey electrode $A_0$ is set to coincide with the angular position markings on the chart of recorder 55. The depth of survey electrode $A_0$ in the well can be marked on the chart of recorder 55 by the operator.

If desired, circuitry can be provided for automatically computing the distance between the two adjacent boreholes. This circuitry is shown connected to the conductor pair 54 by a dotted line conductor pair 54a. A voltmeter 69 is connected across conductor pair 54a. The conductor pair 54a is applied to a maximum to minimum ratio detector 56 whose output is supplied to a suitable function forming circuit 56a and suitable recorder 57, which would comprise another channel of recorder 55. Within the maximum to minimum ratio detector 56, the conductor pair 54a is connected to a maximum peak detector circuit 58. Within the peak detector circuit 58, a first one of the conductors of the conductor pair 54a is connected through a forward biased diode 59, to one side of a capacitor 60 and one input of a gate circuit 61. The second conductor of conductor pair 54a is connected to the other side of capacitor 60 and the return input to gate 61.

The conductor pair 54a is also connected to a minimum peak detector 62. Within the minimum peak detector 62, the first conductor of the conductor pair 54a is connected across a back biased diode 63, to one side of a capacitor 64 and one input of a gate circuit 65. A switch 66 is connected across diode 63. The second conductor of conductor pair 54 is connected to the other side of capacitor 64 and to the return input to gate circuit 65. The control terminals of gates 61 and 65 are connected through a single throw switch 67 to a source of DC voltage. The outputs from gate circuit 61 and 65 are connected to the input of a ratio computer 68, of standard design, for taking the ratio of two applied DC signals. The output from ratio computer 68 is connected to the input of a function forming circuit 56a, the output of which is supplied to recorder 57. The function former 56a includes a resistor $R_3$, connected to the output of ratio computer 68, and to the input of an amplifier 56b and resistor $R_4$, connected in parallel. The output of amplifier 56b is connected to recorder 57. A plurality of diodes $D_1$, $D_2$, etc. (their anodes connected to amplifier 56b), are connected through suitably valued resistors $R_1$, $R_2$, etc. to a plurality of suitable DC voltage sources.

Now concerning the operation of the FIGURE 4 apparatus, the oscillator 54 supplies a constant voltage signal to one side of primary winding 47 of transformer 48. Amplifier 49 amplifies the potential difference existing across transformer 48 and supplies sufficient current to focusing electrode $A_1$ via transformer 43 so as to maintain the voltage on focusing electrode $A_1$. which is supplied to the other side of the primary winding 47, at the same level as the output voltage from oscillator 54. Thus, amplifier 49 will act to maintain the voltage difference across primary winding 47 at substantially zero level.

The voltage difference between focusing electrode $A_1$ and survey electrode $A_0$ is developed across the primary winding 46 of transformer 45, which voltage difference causes amplifier 44 to supply sufficient current to survey electrode $A_0$ to maintain this potential difference between electrodes $A_1$ and $A_0$ at substantially zero volts. This equal potential situation of electrodes $A_0$ and $A_1$ causes the current emitted from focusing electrode $A_1$ to focus the survey current being emitted from survey electrode $A_0$ to a desired flow pattern. Thus, the current through measure resistor 40 is proportional to the resistance presented to central survey electrode $A_0$ since the voltage on electrode $A_0$ is being maintained constant. Thus, the voltage developed across measure resistor 40 is proportional to the current being emitted from survey electrode $A_0$, which voltage is amplified by amplifier 52, and that portion which is in-phase with the oscillator 54 output signal is supplied as a varying DC voltage to recorder 55 at the surface of the earth via conductor pair 54. If desired, a constant current system could be utilized instead of the constant voltage system shown in FIGURE 4, in which case the voltage variations would be measured. Of course, the $A_1$ and $A_0$ electrodes would still be at equipotential. Thus, it can be seen that either electrical parameter, voltage or current, of the emitted survey current can be measured.

Concerning how the apparatus of FIGURE 4 detects nearby casing, at some point during the drilling operation, the connecting means 30 is lowered or pumped through the hollow interior portion of drill pipe 29 and is stopped at the designated point relative to drill pipe section 29a by the stop means which comprises the inclined or sloped portions of drill pipe section 29a and movable connecting means 30 so as to electrically connect the electrodes to the electrical circuitry. The drill pipe 29 is then rotated by rotating means 12a and the electrical parameter measured and supplied to recorder 55 at the surface of the earth. The chart of recorder 55 will have a plot like the one shown in FIGURE 5. The direction of the nearby cased borehole can be determined by noting the angle of the maximum readings, which angle is the direction of the nearby casing. The distance can then be calculated from Equation 7. If desired, a voltmeter could be used to perform this operation instead of a recorder with the operator recording the readings. (A similar rotating means could also be used for the apparatus of FIGURE 1.) Then, the movable connection means is raised to the surface of the earth to allow the drilling operation to continue.

Now concerning the alternative manner of automatically processing the signal indicative of the distance 2d on conductor pair 54, the operator closes switch 66 as the drill pipe 29 in the borehole is slowly rotated. The switch 66 is maintained in a closed position until a maximum reading is obtained across the meter 69. At this point, both capacitors 60 and 64 will be charged up to this maximum voltage. Now, switch 66 is open as the drill pipe 10 is rotated until a minimum reading is obtained on meter 69. It can be seen that the voltage developed across capacitor 60 corresponding to the maximum voltage will remain on capacitor 60 due to the infinite discharge resistance through back biased diode 59 or closed gate 61. On the other hand, as the voltage across the conductor pair 54a decreases, capacitor 64 will discharge through diode 63 until the minimum value of voltage is obtained. If then, the drill pipe 29 is rotated still further, the voltage developed across capacitor 64 will not increase because of diode 63.

Thus, it can be seen that capacitor 60 holds a voltage proportional to the maximum reading developed across conductor pair 54 and capacitor 64 holds a voltage proportional to the minimum reading. The operator then closes switch 67 which opens gates 61 and 65 allowing the voltages held on capacitors 60 and 64 to discharge into ratio computer 68, which computes the ratio of the two applied input signals and applies this ratio information to the function former 56a and recorder 57. The direction of the nearby casing is found by noting the angle of the maximum reading on recorder 55. The minimum reading would be 180° removed from the maximum reading. This angle can be found by marking on the drill pipe at the surface of the earth the angular direction of the survey electrode $A_0$, or if desired, a gyrocompass could be located within the drill pipe section 29a to provide an indication to the surface of the earth. If desired, meter 69 could be omitted and the drill pipe 29 rotated one full turn to obtain the maximum reading while switch 66 is closed, and then another full turn with switch 66 open to obtain the minimum reading. Or, if desired, suitable switching circuitry could be utilized to perform the entire operation automatically.

Looking now at FIGURE 3b, the output signal from ratio computer 68 represents the y-axis of FIGURE 3b corresponding to $E_{(d+R),0}/E_{(d-R),0}$, the x-axis representing $d/R$. It can be seen that if the scale on function former 56a is adjusted to represent the plot of FIGURE 3b, the reading obtained on recorder 57 will correspond to the ratio of $d/R$. Function former 56a performs this function in the well-known manner by utilizing suitable resistor values and voltages $E_1$ and $E_2$. Looking at FIGURE 3b, function former 56a will follow the curve as shown by the dotted line curve 56a by switching resistors into the circuit at the various voltage levels, $E_1$, $E_2$, etc. The points where the curve 56a changes slope are designated $E_1$ and $E_2$ in FIGURE 3b. If desired more slopes could be added to more exactly follow the curve. Since the distance between the two boreholes is equal to $2d$, the function $2/R$ can be added into function former 56a (e.g. resistor $R_3$) so that the signal applied to recorder 57 will be proportional to $2d$. Thus, function former 56a solves the equation $2d = 2R(1-x)/1+x$, where $x$ is the output signal from ratio computer 68.

Looking now at FIGURE 6, there is shown another embodiment of the present invention wherein the distance between a cased borehole and a nearby uncased borehole is determined. In the FIGURE 6 apparatus, four pad members 70, 71, 70a and 71a (pad 71a is behind pad 70a and is not shown in FIGURE 6) are supported in the borehole 72 by a support member 73, which support member 73 is supported in the borehole by an armored multiconductor cable 74. The lower portion of the cable 74 is covered with a suitable insulation material 74a. The cable 74 is reeled in and out of the borehole by a suitable drum and winch mechanism (not shown) at the surface of the earth. The particular wall-engaging pad members 70, 71, 70a and 71a are mounted on spring members 74, 75, 74a and 75a (not shown) which are pivotally connected to slidable collars 76. Slidable collars 76 are slidable between fixed members 77 and 78.

The pad members 70 and 71 include a central survey electrode $A_0$ surrounded by an outer focusing electrode $A_1$. The focusing electrode $A_1$ on pad member 70 is connected to the surface of the earth by a conductor 79; the survey electrode $A_0$ of pad member 70 is connected to the surface by a conductor 80; the focusing electrode $A_1$ of pad member 71 is connected to the surface of the earth by a conductor 81; and survey electrode $A_0$ of pad member 71 is connected to the surface of the earth by a conductor 82. Conductors 79, 80, 81 and 82 pass through armored multiconductor cable 74 to the surface of the earth. One of the conductors 79 or 81 is connected to the metal body of support member 73 and pad members 70a and 71a. A compass device 73a is located within the body of support member 73, a conductor pair 73b supplying the compass indication to recorder 106 at the surface of the earth. By this means, the directions which the pad members 70 and 71 are facing can be determined. To cause rotation of the support member 73 and the pad members, an auxiliary pair of pad members 70a and 71a (not shown) have rib members 70b which are slanted with respect to the support member axis and the horizontal (90° from support member axis). By this means, the support member and pads will rotate as the cable is reeled in, thus allowing the location of the nearby casing to be detected.

Now concerning the electrical circuitry at the surface of the earth, the conductor 79 is connected to the primary winding 83 of a transformer 84 and across the secondary winding 85 of a transformer 86. Secondary winding of transformer 84 is connected to the input of an amplifier 87, the output of which is connected to the primary winding of transformer 86. The conductor 80 is also connected to one side of the secondary winding 88 of a transformer 89, the other side of the secondary winding 88 being connected to the casing of a nearby cased borehole 72a. The secondary winding 88 is also connected across the primary winding 90 of a transformer 91, the secondary winding of transformer 91 being connected to the input of an amplifier 92. The output from amplifier 92 is coupled through a transformer 93, the secondary winding 94 of which is connected between the casing of the nearby cased borehole and through a measure resistor 95 to conductor 82. The conductors 81 and 82 are connected across the primary winding 96 of a transformer 97 and across the secondary winding 98 of a transformer 99. The secondary winding of transformer 97 is connected to the input of an amplifier 100, the output of which is connected to the primary winding of transformer 99.

The primary winding 101 of a transformer 102 is connected across the measure resistor 95, the secondary winding of transformer 102 being connected to the input of an amplifier 103. The output from amplifier 103 is connected to the input of a phase-sensitive detector 104, to which also is supplied the phase-reference signal from a signal generator 105. Signal generator 105 also supplies a signal to the primary winding of transformer 89 so as to develop a constant voltage output signal across the secondary winding thereof. The output from phase-sensitive detector 104 is supplied to a recorder 106, which has a suitable recording medium which moves in proportion to the depth of the tool in the borehole. Alternatively, a calibrated meter could be used to read $2d$ directly.

Now concerning the operation of the FIGURE 6 apparatus, signal generator 105 develops a constant current $I_1$ in the conductor 80 which is supplied to central survey electrode $A_0$ of pad member 70. The feedback circuit comprising transformer 84, amplifier 87 and transformer 86 maintains the focusing electrode $A_1$ of pad member 70 at the same voltage as survey electrode $A_0$ in the same manner as the feedback circuit (amplifier 44) of FIGURE 4. The circuit comprising transformer 91, amplifier 92 and transformer 93 has a voltage gain of "one" and thus the voltage $V_2$ developed across the secondary winding 94 of transformer 93 is equal to the voltage $V_1$ developed across the secondary winding 88 of transformer 89. This voltage $V_2$ developed across secondary winding 94 sets up a current $I_2$ which is emitted from central survey electrode $A_0$ of pad member 71 via conductor 82.

The feedback circuit comprising transformer 97, amplifier 100 and transformer 99 maintains the voltage of focusing electrode $A_1$ at the same potential as the voltage of survey electrode $A_0$ of pad member 71 in the same manner as the feedback circuit associated with pad member 70. Thus, the voltage on all of the electrodes, including the support member 73 are maintained equal to each other. By supplying this votalge to support member 73 and pad members 70a and 71a, a nearly equipotential condition exists around the circumference of the borehole similar to the FIGURES 1 and 4 situation and thus Equation 7 would provide reasonably accurate results in the FIGURE 6 case. It is not necessary, though desirable to maintain support member 73 at the electrode voltage. Also, only one pad member could be used, if desired. In any event, a relationship for the distance $2d$ vs. $E_{(d-R),0}/E_{(d+R),0}$ can be determined where drill pipe is not present, either mathematically in the same manner as Equation 7, or empirically. The current $I_2$ which passes through measure resistor 95 is sensed by amplifier 103 via transformer 102, detected by phase-sensitive detector 104 and a DC signal proportional to the in-phase portion of current $I_2$ is recorded in recorder 106. This survey current $I_2$ is proportional to the ratio of the resistivity measured by survey electrode $A_0$ of pad members 70 and 71, and thus indicative of the distance $2d$ between the two boreholes. By noting the circumferential angle with respect to the compass reading where a maximum ratio signal level is obtained, the direction of the cased borehole can be determined.

The ratio relationship can be better understood by looking at the voltage and current relationships in the apparatus of FIGURE 6. The relationship for the voltage $V_1$ developed across the secondary winding 88 of transformer 89 is:

$$V_1 = k_1 I_1 R_1 \quad (9)$$

where $k_1$ is the calibration constant of pad member 70, and $R_1$ is the resistance presented to the survey electrode $A_0$ of pad member 70. Likewise, the expression for the voltage $V_2$ developed across the secondary winding 94 of transformer 93 is:

$$V_2 = k_2 I_2 R_2 \quad (10)$$

where $k_2$ is the calibration constant of pad member 71, and $R_2$ is the total resistance presented to the survey electrode $A_0$ of pad member 71. Since $V_1$ is maintained equal to $V_2$, Equations 9 and 10 can be written as:

$$k_1 I_1 R_1 = k_2 I_2 R_2 \quad (11)$$

Rearranging Equation 11, we have $$\frac{R_1}{R_2} = \frac{k_2 I_2}{k_1 I_1} \quad (12)$$

Since $I_1$ is maintained constant, Equation 12 takes the form:

$$R_1/R_2 = K I_2 \quad (13)$$

where $$K = \frac{k_2}{k_1 \cdot I_1}$$

It can be seen from Equation 13 that the current $I_2$ through measure resistor 95 is proportional to the ratio of the resistance presented to the survey electrodes of pad members 70 and 71 which is proportional to $$E_{(d-R),0}/E_{(d+R),0}$$

Thus, it can be seen that the support member 73 need only be rotated until the maximum and minimum readings are obtained, and the ratio of $E_{(d+R),0}/E_{(d-R),0}$ will be automatically supplied to recorder 106. Since the minimum to maximum ratio will be at its lowest level (maximum to minimum will be at highest level) when the survey electrode $A_0$ of pad members 70 and 71 are aligned along the x-axis of FIGURE 3a, the lowest amplitude (or highest, if desired) can be read from recorder 106 to give $E_{(d-R),0}/E_{(d+R),0}$. Recorder 106 will then indicate depth, compass direction of the electrode arrays and $E_{(d-R),0}/E_{(d+R),0}$.

Referring to FIGURE 6, a representation of the effect of the nearby casing 72a on the current emitted from the electrodes is shown. The survey current emitted from the survey electrodes $A_0$ is represented by solid lines and the focusing current emitted from the focusing electrodes $A_1$ and support member 73 is represented by dashed lines. The current emitted from the electrode array on pad member 71, which is shown facing the nearby casing 72a, returns directly to the nearby casing, which is the current return point for the electrical system. On the other hand, the current emitted from the survey electrode $A_0$ on pad member 71 is not able to return directly to the nearby casing 72a because of the focusing action of the remainder of the electrodes, including support member 73. This, then causes a higher resistance to be presented to survey electrode $A_0$ of pad member 71 than the resistance presented to survey electrode $A_0$ of pad member 70.

The distance above support member 73 to which the insulation material 74a extends can be varied to give the desired response since the current returns to the armored cable 74. The current return point could be made either the nearby casing 72a of the armored cable 74 (or drill pipe in FIGURES 1 and 4) since the impedance between the cable armor 74 and nearby casing over the great distance to the surface of the earth is zero.

It can be seen that, if desired, only one pad member could be utilized (with suitable centering means), instead of the two pad members 70 and 71 shown in FIGURE 6. In this event, the single pad member would be rotated so as to obtain both the maximum and minimum readings in the same manner as in FIGURE 1.

The curve of FIGURE 3b has application to the case of a circular metal conductor extending around the circumference of the borehole, which is not the case in the FIGURE 6 apparatus. However, the same process utilized to arrive at Equation 7 can be utilized to determine the particular mathematical relationship for the apparatus of FIGURE 6, or alternatively, this relationship can be determined empirically to arrive at a graph of the type shown in FIGURE 3b. Also, if desired, a function forming circuit with a recorder, or a calibrated meter could be utilized to determine the distance 2d automatically.

It is to be understood that the particular electrical circuitry shown in each of the embodiments could be utilized with the other embodiments equally as well. Likewise, other forms of electrical circuitry for use with a focused electrode investigating device can be utilized. Thus, the electrical circuitry shown in FIGURE 1 could be utilized equally as well with the apparatus of FIGURE 4 and vice versa. Also, a system similar to the dual pad system of FIGURE 6 for providing one signal indicative of the ratio of the maximum to minimum values could be utilized with FIGURE 1 or 4 by inserting a survey electrode suitably insulated from the focusing electrode $A_1$ on the opposite side of the survey electrode $A_0$ shown in FIGURES 1 and 4. The electrical circuitry would then be similar to that shown in FIGURE 6 except that only one feedback circuit need be utilized since there is only one focusing electrode. Likewise, in FIGURE 6, only one feedback circuit could be utilized if desired. It is also to be understood that the electrical circuitry utilized with the particular downhole investigating apparatus could be either located downhole or at the surface of the earth, as desired.

Up to this point, the apparatus of the present invention has been discussed in connection with the detection of a cased borehole from a nearby borehole. However, it will be appreciated that the novel arrangement shown in FIGURE 4 for making connection to a electrode array embedded in casing pipe could be utilized with general purpose well logging apparatus and not just apparatus for detecting nearby casing. As stated earlier, it has been difficult to lower a connection means into the borehole during a drilling operation to obtain well logging measurements with the drill pipe still in the borehole, due to the problem of current leakage at the point where the movable connecting means makes electrical contact with the electrodes embedded in the drill pipe.

It can be seen in FIGURE 4 that by utilizing a focused electrode array wherein all of the electrodes are at the same potential, the problem of current leakage is substantially minimized since all of the points at which the movable connecting means makes connection with the downhole electrical apparatus are at the same potential. Thus, the apparatus of FIGURE 4 can be utilized to make general well logging measurements by merely recording the signal developed across conductor pair 54, which is proportional to the resistivity of the surrounding earth formations. If desired, the electrical apparatus shown within dotted line box 39 in FIGURE 4 could be placed at the surface of the earth and the return conductor to oscillator 54, instead of being returned to chassis ground, could be embedded in the earth at some distance from the cased borehole being presently drilled to obtain a more accurate reference potential. In the circuits utilized for the detection of nearby casing, the particular reference or ground potential (i.e. chassis ground designations) used is not important since the ratio of two quantities is what is desired. However, for general well logging, it is important to have an accurate reference potential.

Figure 7:
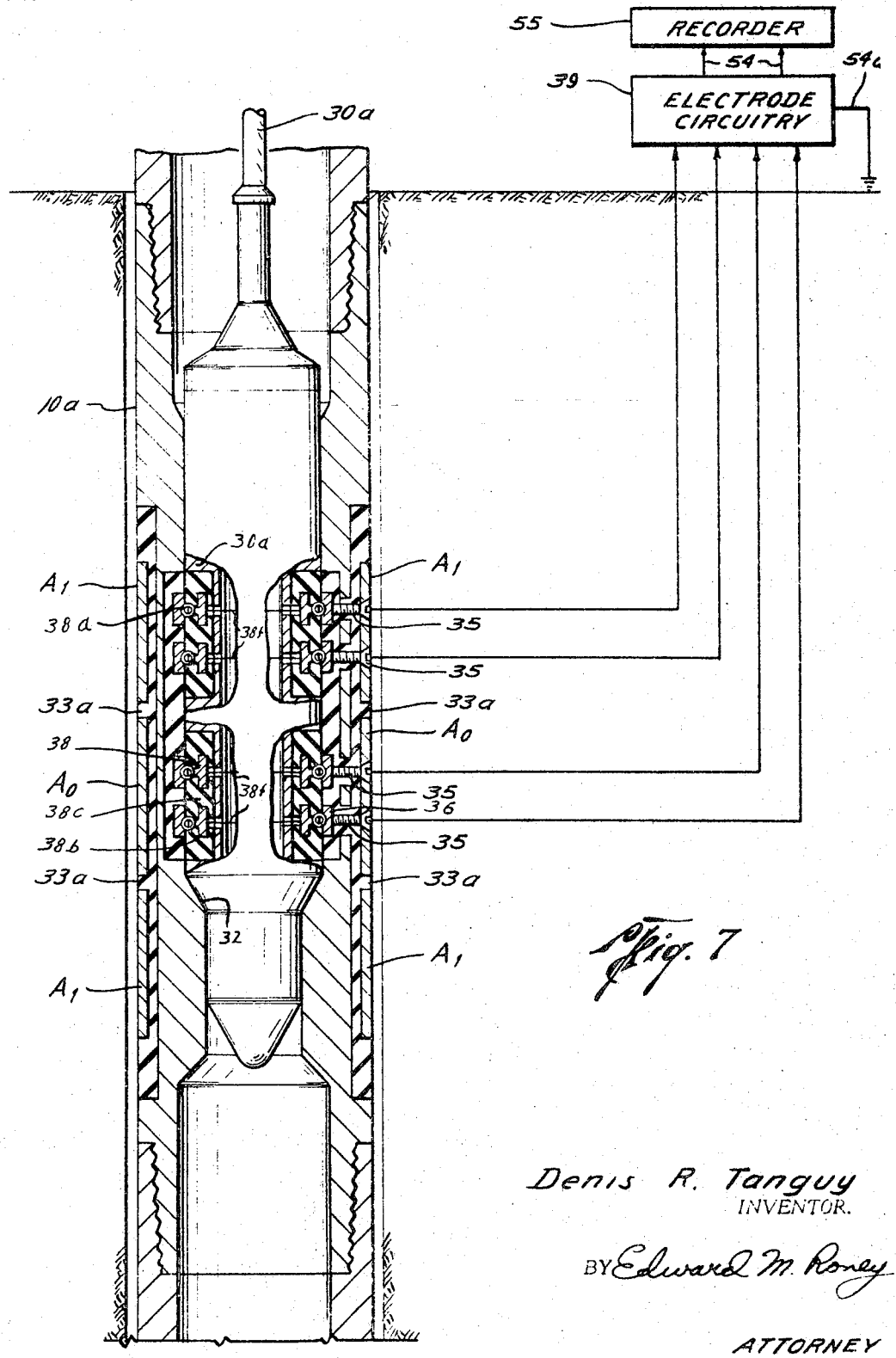
FIGURE 7 illustrates another embodiment of an electrode array embedded in a portion of a drill pipe for the general investigation of the surrounding earth formations.

Now looking at FIGURE 7, there is shown apparatus similar to the apparatus shown in FIGURE 4, with the exception that the electrodes extend around the entire circumference of the drill pipe section 10a. The survey electrode $A_0$ emits survey current in all radial directions from the borehole and this survey current is focused by focusing current emitted from focusing electrodes $A_1$, which also emits focusing current in all radial directions from the drill pipe section 10a. Suitable conductors connect the current-supplying and measuring points on electrodes $A_0$ and $A_1$ to the surface of the earth via multi-conductor cable 30a to the electrode circuitry 39 at the surface of the earth. Electrode circuitry 39 shown in FIGURE 7 corresponds to the electrical circuitry shown within the dotted line box 39 of FIGURE 4 with the exception that the conductor 54a from oscillator 54 is connected to a suitable remote point at the surface of the earth so as to obtain a zero reference potential for accurate measurement purposes. The output from electrode circuitry box 39 is supplied to recorder 55 over conductor pair 54 in the same manner as in FIGURE 4. Thus, recorder 55 records conductivity measurements of the surrounding earth formations in the well-known manner.

Thus, it can be seen that the apparatus of the present invention will provide connections to an electrode array embedded in the casing at the bottom of the borehole without the prior problems of current leakage at the connection, not only for apparatus for detecting nearby casing, but also for general purpose well logging. Although it has not been shown in the drawings (for simplicity), it is to be understood that it would be desirable to have two conductors connecting each of the electrodes to the electrical circuitry, so that the voltage drop through the current carrying conductors will not affect the measuring or monitoring circuits, especially where the electrical circuitry is at the surface of the earth.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for detecting the location of a cased borehole from another nearby borehole, comprising:
    (a) at least one electrode array within the nearby borehole adapted to rotate circumferentially around the nearby borehole, said at least one electrode array comprising:
        (1) a central survey electrode defining a circumferential angle around the nearby borehole of less than 360 degrees;
        (2) an outer focusing electrode surrounding the central survey electrode;
    (b) means for supplying current to the survey and focusing electrodes for emission into the surrounding earth formations, the emitted focusing current confining the emitted survey current to a desired current flow pattern;
    (c) means for measuring an electrical parameter of the current emitted from the central survey electrode as the electrode array is rotated circumferentially around the nearby borehole; and
    (d) means responsive to the measured electrical parameter for providing first and second signals individually representative of the maximum and minimum values respectively of the measured electrical parameter for each 360 degree revolution of the central survey electrode around the borehole to determine the distance between a cased borehole and the nearby borehole.

2. Apparatus for detecting the location of a cased borehole from another nearby borehole, comprising:
    (a) at least one electrode array within the nearby borehole adapted to rotate circumferentially around the nearby borehole, said at least one electrode array comprising:
        (1) a central survey electrode defining a circumferential angle around the nearby borehole of less than 360 degrees;
        (2) an outer focusing electrode surrounding the central survey electrode;
    (b) means for rotating said at least one electrode array circumferentially around the nearby borehole;
    (c) means for supplying current to the survey and focusing electrodes for emission into the surrounding earth formations, the emitted focusing current confining the emitted survey current to a desired current flow pattern;
    (d) means for measuring an electrical parameter of the current emitted from the central survey electrode as the electrode array is rotated circumferentially around the nearby borehole; and
    (e) means responsive to the measured electrical parameter for providing first and second signals individually representative of the maximum and minimum values respectively of the measured electrical parameter for each 360 degree revolution of the central survey electrode around the borehole to determine the distance between a cased borehole and the nearby borehole.

3. Apparatus for detecting the location of a cased borehole from another nearby borehole, comprising:
    (a) at least one electrode array within the nearby borehole adapted to rotate circumferentially around the nearby borehole, said at least one electrode array comprising:
        (1) a central survey electrode defining a circumferential angle around the nearby borehole of less than 360 degrees;
        (2) an outer focusing electrode surrounding the central survey electrode;
    (b) means for supplying current to the survey and focusing electrodes for emission into the surrounding earth formations, the emitted focusing current confining the emitted survey current to a desired current flow pattern;
    (c) means for measuring an electrical parameter of the current emitted from the central survey electrode as the electrode array is rotated circumferentially around the nearby borehole;
    (d) means responsive to the measured electrical parameter for providing indications of the maximum and minimum values of the measured electrical parameter to determine the distance between a cased borehole and the nearby borehole; and
    (e) means responsive to the maximum and minimum values of the measured electrical parameter for determining the distance between the two boreholes.

4. The apparatus of claim 3 wherein the means for determining the distance between two boreholes includes:
    means responsive to the maximum and minimum values of the measured electrical parameter for generating an output signal indicative of the ratio of the minimum to the maximum values; and
    means responsive to the output signal for providing an indication of the distance between the two boreholes.

5. Apparatus for detecting the location of a cased borehole from another nearby borehole, comprising:
    (a) at least one electrode array within the nearby borehole, said at least one electrode array comprising:
        (1) a central survey electrode defining a circumferential angle around the nearby borehole of less than 360 degrees;
        (2) an outer focusing electrode surrounding the central survey electrode;

(b) means for rotating the electrode array circumferentially around a borehole;
(c) means for supplying current to the survey and focusing electrodes for emission into the surrounding earth formations, the emitted focusing current confining the emitted survey current to a desired current flow pattern;
(d) means for measuring an electrical parameter of the current emitted from the central survey electrode as the electrode array is rotated circumferentially around the nearby borehole;
(e) means responsive to the measured electrical parameter measuring the maximum and minimum values of the measured electrical parameter; and
(f) means responsive to the maximum and minimum values of the measured electrical parameter for determining the distance between the two boreholes.

6. Apparatus for detecting the location of a cased borehole from another nearby borehole having drill pipe located therein, comprising:
(a) at least one electrode array embedded in a section of the drill pipe in the nearby borehole and adapted to rotate circumferentially around the nearby borehole, said at least one electrode array comprising:
  (1) a central survey electrode defining a circumferential angle around the nearby borehole of less than 360 degrees;
  (2) an outer focusing electrode surrounding the central survey electrode;
(b) means for supplying current to the survey and focusing electrodes for emission into the surrounding earth formations, the emitter focusing current confining the emitted survey current to a desired current flow pattern;
(c) means for measuring an electrical parameter of the current emitted from the central survey electrode as the electrode array is rotated circumferentially around the nearby borehole; and
(d) means responsive to the measured electrical parameter for measuring the maximum and minimum values of the measured electrical parameter to provide indications thereof for use in determining the distance between a cased borehole and the nearby borehole.

7. The apparatus of claim 6 and further including: means responsive to the indications of the maximum value $A_{max}$ and minimum value $A_{min}$ of the measured electrical parameter for determining the distance $2d$ between the two boreholes in accordance with relationship:

$$2d = \frac{2R(A_{max.} - A_{min.})}{A_{max.} + A_{min.}}$$

where R is the radius of each of the two boreholes.

8. Apparatus for detecting the location of a cased borehole from another nearby borehole, comprising:
(a) at least one electrode array embedded in a section of a drill pipe within the nearby borehole and which drill pipe is adapted to rotate circumferentially around the nearby borehole, said at least one electrode array comprising:
  (1) a central survey electrode defining a circumferential angle around the nearby borehole of less than 360 degrees;
  (2) an outer focusing electrode surrounding the central survey electrode;
(b) connecting means embedded in said section of a drill pipe having contacts electrically connected with individual ones of said electrodes;
(c) movable connecting means adapted to be lowered through a borehole for making electrical contact with the embedded connected means and including electrical contact means adapted to be urged toward the connecting means embedded in the drill pipe section to make electrical contact therewith, a portion of said movable connecting means and a portion of said drill pipe section being tapered in a mating relationship for stopping the descent of the movable connecting means at a predetermined fixed position with respect to the section of drill pipe;
(d) means connected with the movable connecting means for supplying current to the survey and focusing electrodes for emission into the surrounding earth formations, the voltages on said survey and focusing electrodes being substantially the same so that current leakage will be minimized between contacts of each of said connecting means; and
(e) means for measuring an electrical parameter of the current emitted from the central survey electrode as the electrode array is rotated circumferentially around the nearby borehole, the electrical parameter being indicative of the location of the cased borehole.

9. Apparatus for investigating earth formations surrounding a borehole with drilling apparatus present in the borehole, comprising:
(a) a focused electrode array, including survey and focusing electrodes and connecting means for making electrical contact with said electrodes embedded in a portion of a drilling pipe, a portion of said drill pipe having a progressively reduced internal diameter;
(b) means adapted for supplying current to the survey and focusing electrodes of the focused electrode array for emission into the surrounding earth formations to provide a measure of an electrical parameter of a formation, the voltage on said survey and focusing electrodes being maintained substantially the same; and
(c) movable connecting means adapted to be lowered through the borehole to the electrode array to connect the current-supplying and measuring means to the connecting means of the electrode array, said movable connecting means having electrical contact means extending circumferentially around the movable connecting means and adapted to be urged toward the connecting means of the electrode array to make contact therewith, a portion of said movable connecting means having a progressively reduced outer diameter for engagement with the progressively reduced inner diameter of said drill pipe portion to properly position the contacts of the movable connecting means relative to the electrode array connecting means, whereby the substantially equal voltages on the survey and focusing electrodes substantially prevents current leakage between the contacts of the connecting means.

10. Apparatus for detecting the location of a cased borehole from another nearby borehole, comprising:
(a) at least two electrode arrays within the nearby borehole adapted to rotate circumferentially around the nearby borehole, said at least two electrode arrays comprising:
  (1) a central survey electrode within each electrode array defining a circumferential angle around the nearby borehole of less than 360 degrees;
  (2) at least one outer focusing electrode surrounding the central survey electrodes;
(b) means for supplying a constant current to a first one of the survey electrodes for emission into the surrounding earth formations;
(c) means for maintaining the voltage of said at least one focusing electrode and a second survey electrode substantially the same as the voltage of the first survey electrode; and
(d) means for measuring an electrical parameter of the current emitted from the second survey electrode as the electrode array is rotated circumferentially around the nearby borehole, the electrical parameter being proportional to the ratio of the resistance presented to the first electrode to the resistance presented to the second electrode.

11. The apparatus of claim 10 and further including means for providing an indication of the azimuth direction of the electrode arrays, the azimuth direction where the measured electrical parameter is at a maximum level indicating the direction of the cased borehole.

12. The apparatus of claim 10 and further including means responsive to the measured electrical parameter for indicating the distance between the two boreholes.

13. A method of detecting the location of a cased borehole from another nearby borehole, comprising:
    (a) rotating at least one focused electrode array circumferentially around the interior of a nearby borehole, said focused electrode array having a central survey electrode defining a circumferential angle of less than 360 degrees around the nearby borehole;
    (b) supplying current to the survey and focusing electrodes for emission into the surrounding earth formations, the emitted focusing current confining the emitted survey current to a desired current flow pattern;
    (c) measuring an electrical parameter of the current emitted from the central survey electrode as the electrode array is rotated circumferentially around the nearby borehole;
    (d) detecting the direction of a cased borehole in response to the maximum value of the electrical parameter correlated with the circumferential direction of the central survey electrode.

14. The method of claim 13 and further including the steps of:
    (e) generating signals indicative of the maximum and minimum amplitudes of the measured electrical parameter in response to the measured electrical parameter;
    (f) generating a signal indicative of the ratio of the minimum to maximum amplitudes; and
    (g) indicating the distance between the two boreholes in response to the ratio signal.

15. The method of claim 14 wherein the electrode array is embedded in a portion of drill pipe within the nearby borehole and the step of indicating the distance $2d$ between the two boreholes includes generating a signal in response to the ratio $x$ of the minimum to maximum amplitudes in accordance with the relationship:

$$2d = \frac{2R(1-x)}{x+1}$$

where R is the radius of the casing and drill pipe in the two boreholes.

16. A method of detecting the location of a longitudinally extending conductive object from a nearby borehole, comprising:
    (a) rotating at least one focused electrode array circumferentially around the nearby borehole, said focused electrode array having a central survey electrode defining a circumferential angle of less than 360 degrees around the nearby borehole;
    (b) supplying current to the survey and focusing electrodes for emission into the surrounding earth formations, the emitted focusing current confining the emitted survey current to a desired current flow pattern;
    (c) measuring an electrical parameter of the current emitted from the central survey electrode as the electrode array is rotated circumferentially around the nearby borehole; and
    (d) detecting the maximum and minimum values of the measured electrical parameter and determining from said detected values, the distance of the conductive object from the nearby borehole.

References Cited

UNITED STATES PATENTS

| | | | |
|---|---|---|---|
| 3,086,167 | 4/1963 | Chaney et al. | 324—10 XR |
| 3,378,097 | 4/1968 | Straus et al. | 324—10 XR |
| 2,370,818 | 3/1945 | Silverman | 324—10 XR |
| 2,650,067 | 8/1953 | Martin | 324—10 XR |
| 2,826,736 | 3/1958 | Doll | 324—10 XR |
| 2,963,641 | 12/1960 | Nanz | 324—1 XR |
| 3,060,373 | 10/1962 | Doll | 324—10 XR |
| 3,068,401 | 12/1962 | Janssen | 324—1 |
| 3,075,142 | 1/1963 | Albright et al. | 324—1 |
| 3,163,816 | 12/1964 | Clements et al. | 324—1 |
| 3,286,163 | 11/1966 | Holser et al. | 324—6 |
| 3,293,542 | 12/1966 | Piety | 324—10 |
| 3,361,964 | 1/1968 | Hanson et al. | 324—61 |

FOREIGN PATENTS 685,727   5/1964   Canada.

GERARD R. STRECKER, Primary Examiner

U.S. Cl. X.R.

324—10